United States Patent [19]

Hauser et al.

[11] Patent Number: 6,127,770

[45] Date of Patent: Oct. 3, 2000

[54] PRESSURE WAVE SENSOR

[75] Inventors: Wolfgang Hauser, Stutensee; Robert Götz, Kuhardt, both of Germany

[73] Assignee: Forschungszentrum Karlsrahe GmbH, Karlsruhe, Germany

[21] Appl. No.: 09/106,338

[22] Filed: Jun. 29, 1998

Related U.S. Application Data

[63] Continuation-in-part of application No. PCT/EP96/05463, Dec. 6, 1996.

[30]  Foreign Application Priority Data

Jan. 20, 1996  [DE]  Germany ........................... 196 02 048

[51] Int. Cl.[7] ..................................................... H01L 41/08
[52] U.S. Cl. ............................................. 310/338; 310/324
[58] Field of Search ..................................... 310/338, 324, 310/334

[56]  References Cited

U.S. PATENT DOCUMENTS

| | | |
|---|---|---|
| 3,066,232 | 11/1962 | Branson . |
| 3,187,207 | 6/1965 | Tomes . |
| 4,663,965 | 5/1987 | Metcalf et al. ........................ 73/49.3 |
| 4,667,127 | 5/1987 | Krempl et al. ......................... 310/338 |
| 4,799,301 | 1/1989 | Scott et al. .............................. 29/25.35 |
| 4,940,915 | 7/1990 | Scott et al. ............................... 310/338 |
| 5,126,617 | 6/1992 | Lukasiewicz et al. ................... 310/338 |
| 5,488,868 | 2/1996 | Ootake et al. ........................... 310/338 |

FOREIGN PATENT DOCUMENTS

| | | |
|---|---|---|
| 0 401 643 | 12/1990 | European Pat. Off. . |
| 26 46 209 | 5/1980 | Germany . |
| 3 099855 | 4/1991 | Japan . |

OTHER PUBLICATIONS

J–I. Kim et al., "Laser–Induced Photoacoustic Spectroscopy For The Speciation Of Transuranic Elements In Natural Aquatic Systems", *Topics in Chemistry*, vol. 157, 1990, pp. 131–179.

*Primary Examiner*—Nestor Ramirez
*Assistant Examiner*—Peter Medley
*Attorney, Agent, or Firm*—Klaus J. Bach

[57]  ABSTRACT

In a pressure wave sensor comprising a cylindrical housing having a piezo electric element disposed therein, which is forced by a spring against the front face of the housing, the front face consists of a metal foil and a pressure pad consisting of a soft metal is disposed between the piezo electric element and the metal foil, the spring force being sufficiently large to load the pressure pad beyond its yield limit.

5 Claims, 4 Drawing Sheets

PRESSURE WAVE SENSOR

This is a continuation-in-part application of international application PCT/EP96/05463 filed Dec. 6, 1996 and claimimg priority of German application 196 02 048.4 filed Jan. 20, 1996.

BACKGROUND OF THE INVENTION

The invention relates to a pressure wave sensor consisting of a piezo electric element secured in a cylindrical housing where the piezo electric element is pressed by a spring against a front surface of the housing, which front surface comprises at least two layers.

With laser-induced photoacoustic spectroscopy, a transparent sample including the compound to be subjected to spectroscopy (for example, an aqueous solution) is irradiated by short repetitive light impulses of high intensity from a pulsed laser light source. Because of the photothermal absorption and the resulting local heat expansion, shock waves are generated in the sample. A pressure wave sensor (piezo ceramic detector) which is firmly engaged with the sample converts the pressure waves into a voltage signal. The time-dependent voltage curve ideally corresponds to an attenuated oscillation and is proportional to the absorption in the sample.

The following equation applies:

Piezo voltage $U = k \cdot (\beta \cdot v^2 / c_p) \cdot \alpha \cdot I_o$, wherein:

$\beta = \beta(T)$: thermal expansion coefficient of the sample,
$v = v(T)$: sound velocity in the sample,
$c_p = c_p(T)$: specific heat at constant pressure,
$\alpha = \epsilon \cdot c$: absorption coefficient
$\epsilon$: molar extraction coefficient
$c$: concentration
$I_o$: laser energy For the recording of absorption spectra, the wave length of a narrow band excitation laser (for example Nd: YAG— pumped coloring agent laser) is tuned and recorded with the respective piezo voltage. With an appropriate experimental arrangement detection limits are reached (signal/noise ratio S/N=3) which are lower than those common in the conventional high-resolution absorption spectroscopy by about 2 orders of magnitude.

Such a pressure wave sensor is known for example, from J. I. Kim, R. Stump, R. Klenze, "Laser-induced Photoacoustic Spectroscopy for the Specification of Transwavic Elements in Natural Aquatic Systems", Topics in Current Chemistry, Vol. 137, Springer Verlag Berlin, Heidelberg, 1990, p. 131–179.

On pages 148–155, various photoacoustic measuring cells are described. In these measuring cells, the piezo detector is disposed in metal housings to be shielded from electromagnetic radiation, the housings being coupled to quartz glass cuvettes for the transmission of sound waves. The coupling is generally achieved by spiral springs which are supported on the piezo housing or respectively, on corresponding support structures or by the weight of the sample to be measured. (The sample is disposed in the PZT detector). A gel-like liquid introduced between the detector housing and the sample, or respectively, between the PZT detector and the detector housing, improves the sound wave transmission.

Since the vibration systems (piezo detector, housing, engagement springs) are not optimized with regard to the properties referred to earlier (maximum voltage signal, vibration only at the piezo detectors frequency, no harmonic vibration), it has not been possible to utilize the maximally possible signal amplitude. furthermore, the interpretation of the detected piezo signals is difficult, particularly at low sample concentrations.

With the arrangements described reproducible measurement signals were difficult to obtain because of the geometric arrangement (for example, the sample cuvette disposed on the detector) or because of the use of additional contacting means for the sound transmission. Furthermore, the use of contacting means requires additional cleaning steps for the sample cuvettes which have to comply with the highest optical and chemical purity requirements.

For a functional 2-channel operation, that is, for on-line underground subtraction (subtraction of the LPAS-signal of the solvent from the LPAS-signal of the cuvette), it is necessary that both piezo detectors provide identical signals when they are excited in the same manner. In the state of the art, this was possible only in a limited way since encapsulated detectors providing identical signals could not be made.

With the limitations in the use of the laser-induced photoacoustic spectroscopy, highly sensitive optical measurement procedures are not routinely available. Although this method is substantially more sensitive than the conventional transmission spectroscopy, there are only very few apparatus of this type in existence.

It is the object of the present invention to provide a pressure wave sensor of the type referred to earlier, which however has an improved detection sensitivity.

SUMMARY OF THE INVENTION

In a pressure wave sensor comprising a cylindrical housing having a piezo electric element disposed therein, which is forced by a spring against the front face of the housing, the front face consists of a metal foil and a pressure pad consisting of a soft metal is disposed between the piezo electric element and the metal foil, the spring force being sufficiently large to load the pressure padbeyond its yield limit.

Since with photoacoustic measurements, the voltage signals are very small for low sample concentrations even with high laser energy applications, they need to be amplified by low noise amplifiers (tuned to the resonance frequency of the pressure sensor) to obtain measurable signals. However, for low noise signals one tries to keep the amplification as small as possible (because of the noise of the amplifier). For this reason, the pressure wave sensor according to the invention or respectively its arrangement relative to the exciting laser beam is particularly suitable, since it provides a relatively high voltage signal with minimal noise.

With the laser-induced photo acoustic spectroscopy generally pressure wave sensors consisting of piezoelectric ceramics (PZT detectors are used). With a short term mechanical load, these PZT detectors are subject to an attenuated vibration at their harmonic frequency which depends on their geometry. In a pressure wave sensor for the LPAS spectrometer, the metal housing including components needed for shielding against electromagnetic noise and for improved handling is so designed that the PZT-detector resonance vibration can fade out in an undisturbed manner (base vibration without excitation of harmonics, while avoiding phase shifts). Only under these conditions is it easily possible to interpret the time-dependent voltage signals detected at the spectrometer.

For the transmission of the pressure wave generated in the sample to the PZT detector, the detector must be mechanically coupled to the sample. It is particularly important in this connection that the sound (or pressure wave) transmission is reproducible. For this reason, the coupling is done after each sample change always in the same manner and with the same quality.

The invention will be described below in greater detail on the basis of the accompanying drawings.

DESCRIPTION OF A PREFERRED EMBODIMENT

The sensor as described herein has a cylindrical shape. The piezo electric detector is excited in axial direction. With an absorption length of 10 mm, that is, for a standard sample cuvette with 10×10 mm cross-sectional area (inside measurement), the pressure wave is best sensed with piezo detector having a diameter of 10 mm. The detector sensitivity increases with increasing detector thickness, but the vibration properties deteriorate with increasing thickness because of the increasing attenuation. Optimization experiments show that a detector of 5 mm thickness provides the highest voltage signal with vibration properties which can still be interpreted. With a short excitation (ca 5 ms), this detectors vibrates at a resonance frequency of 200 kHz. The voltage amplification of the piezo signal is obtained using an external 20/40 dB low noise amplifier.

Figure 1:
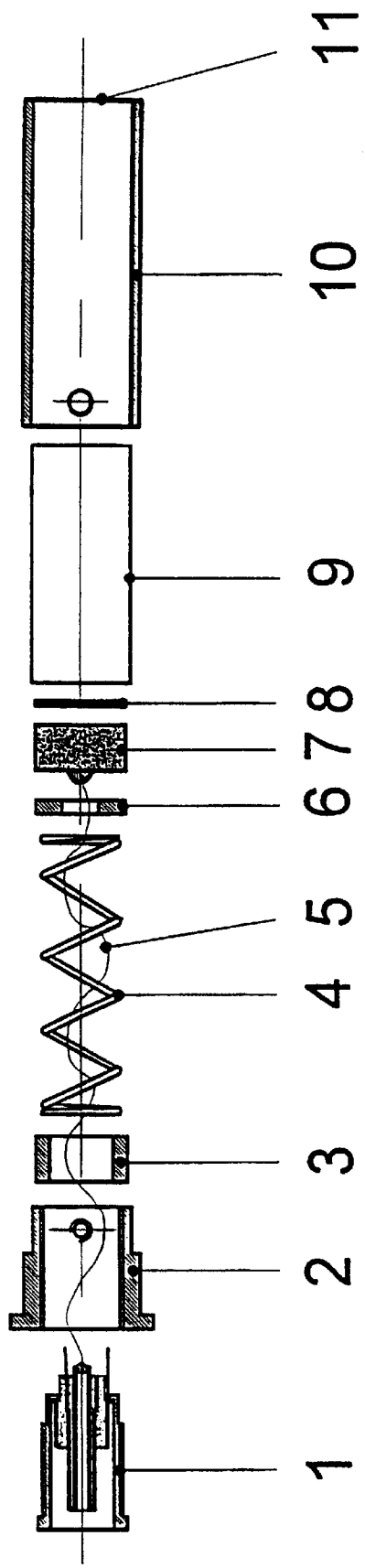
FIG. 1 is an exploded view of the sensor.

FIG. 1 shows the components of the pressure wave sensor. The co-axial sleeve 1 for sensing the piezo voltage is fixed in the housing end part 2. A spacer ring 3 consisting of a non-conductive material serves as insulation between the spring 4 and the housing end part 2 and as a support for the spring 4. Contact between one side of the piezo detector and the inner conductor of the co-axial sleeve is established by way of an insulated wire 5. An insulating washer 6 serves as the second support for the compression spring 4.

As the piezo detector 7, a lead-circonate-titanate detector with nickel electrodes is used.

An insulating foil sleeve 9 (polyethylene) is used for insulating the components with respect to the housing 10 (sleeve tube) and as guide structure. Ground contact for the piezo detector is established by way of the housing. The housing end part 2 is preferably screwed onto the housing 10.

The piezo detector 7 is pressed by the spiral spring 4 onto the thin vibration membrane 11 consisting of stainless steel. The spiral spring 4 is very important for the sensor, which vibrates only at its resonance frequency. Experiments have shown that the pressure wave sensor has the desired properties only if the thickness of the vibration membrane is much smaller than the thickness of the housing wall. In the exemplary embodiment described herein a vibration membrane 11 is employed which consists of a stainless steel foil which is polished at both sides and has a thickness of 15–45 $\mu$m. The thickness of the housing wall is 1 mm.

For an optimal acoustic coupling of the sensor to the measurement sample, there is disposed between the vibration membrane 11 and the piezo detector 7, a disc 8, which is about 0.4 mm thick and consists of a soft metal such as indium (rolled indium seal wire or indium foil) and which serves as a pressure pad 8. When the sensor housing is closed, the spiral spring 4 presses the piezo detector onto the vibration membrane 11 fixed to the stainless steel housing 10 by way of the pressure pad 8. The pressure pad 8 which is loaded beyond its yield point adapts at both sides to the surface roughnesses and accommodates any surface unevenness. Because of the elastic-plastic deformation, the vibration membrane 11 is forced about 0.1–08 $\mu$m beyond the edge of the stainless steel housing 10, whereby the contact surface between the piezo detector and the membrane is free from vibration dampening air enclosures even without the contact means normally used (i.e. glycerin).

For a good coupling, the whole pressure wave sensor is pressed by a second spiral spring (not shown, spring force about 20 N) against the cuvette 13 including the sample 14, which is disposed parallel to the membrane surface. The engagement pressure should be large enough that the arching of the vibration membrane 11 generated by the inner spring 4 is essentially compensated. The oppositely directed spring forces provide for an optimal coupling of the piezo detector 7 to the cuvette within a very short time. Furthermore, the axial vibrations to be measured are favored by the resulting annular relaxation of the vibration membrane 11.

For fixing a stainless steel foil suitable as a vibration membrane to the thin-walled stainless steel sensor housing a suitable soldering process had to be developed. It required that a mechanically reliable (high spring forces particularly with a one-sided load) and electrically conductive connection was established between the vibration membrane 11 and the sleeve tube 10 (wall thickness 1 mm). With the soldering procedure, it is particularly important that no soldering agent exits at the inner surface of the membrane tube since this would detrimentally affect the vibration capability of the membrane.

The fixing occurs by soldering in a preheated laboratory oven. A suitable clamping device and a wire-like stainless steel soldering material with a fluxing agent is used herefor. Quite suitable is the VA-solder according to DIN 8505 of the company Duratrode (Dreieichstrasse 6, M öhrfelden—Walldorf) of the type Dura-Solder HS, DT 5311-116 with 1.6 mm diameter and fluxing agent contained therein. It has a melting point of 221° C. The clamping device consists of a heat conductive brass base plate onto which the VA foil 11 to be soldered is disposed. The foil is square and is first oversize. A clamping element which is supported cantilever-like toward the back engages the cylindrical housing 10 of the sensor housing with the VA foil 11 to be soldered to the cylindrical housing by means of a clamping screw. The inner surface of the sleeve tube cannot be chamfered at the area to be soldered since during soldering the solder would then flow up on the inner surface. But the outer sleeve surface is slightly chamfered (chamfer about 0.1 mm×45°). The clamping device is supported on the thick metal plate which serves as a heat sink. The heat capacity of the metal plate must be much greater than that of the base plate, for example, it could be a 10 mm thick brass plate of a size 65×75 mm.

For the soldering procedure itself, the solder wire 12 with 1.6 mm diameter is compressed to a cross-section of about 1×2 mm so that it is flat. It is divided into sections which are arranged on the VA foil 11 annularly around the housing tube 10, which is clamped onto the foil. It has been found that, with an arrangement of 6 annular segments arranged at a distance of about 1 mm from one another and from the housing tube 10, good soldering results can be obtained.

For the actual soldering procedure, a laboratory oven is needed which can be heated to at least 400° C. and which has an easily accessible sample space. In the present case, the oven with the heat storage plate disposed therein is heated to 395° C. in about 30 minutes. After reaching this final temperature, the clamping device with the work pieces and the prepared solder is placed onto the heat storage plate in the oven and the oven is closed. By capillary action the solder 12 enters the gap between the VA foil 11 and the stainless steel housing 10 which gap is formed by the surface roughness. After about 2 minutes, the soldering procedure is completed and, for a good soldering result, the clamping device then has to be removed. After cooling in air, the work piece is removed from the clamping device and the excess VA foil 11 is machined off.

Below the tolerance ranges for some parameters are given:

Piezo Geometry (Piezo Ceramics)

Cylinder geometry

Diameter

For maximum measuring sensitivity and minimal noise sensitivity, the diameter of the piezo ceramic must be adapted to the diameter of the measurement sample. For this reason, in the example described with a measuring cuvette with 1 cm absorption length, a piezo ceramic with 10 mm diameter was selected. For measuring samples (cuvettes) with other absorption lengths, the diameter should be changed accordingly.

Thickness

For a given diameter of 10 mm, the piezo thickness was optimized by preliminary tests. Based on this optimization, a piezo thickness of 5 mm was chosen for cuvettes with 1 cm absorption length. The thickness may be between 2 and 15 mm.

Housing Geometry

Cylinder geometry

Inner Diameter

The inner diameter is the result of the diameter of the piezo ceramic+2 times the thickness of the insulation sleeve+a tolerance for assembly or respectively, on unimpeded movement of the inserts engaged by the spiral spring.

Wall Thickness of the Housing

The wall thickness of the housing has no particular impact on the function of the sensor. For weight and rigidity reasons, a wall thickness of 1 mm was selected.

Length

The length depends on the dimensions of the inserted components and the mechanical performance data of the spiral spring. In the present case, a length of 35 mm was selected (the spring force in the housing is about 20N). Likely, lengths of 30 to 50 mm could be selected (whereby the spring force changes accordingly) without detrimentally affecting the functionality of the sensor. A precondition, however, is that the spring force of the outer spring is appropriately adapted (spring force inside=about spring force outside)>

Vibration Membrane 11 (Thickness of the Cylinder Bottom)

For the shielding of electromagnetic radiation, it is necessary to use a fully closed metal housing, that is, a metallic cylinder bottom is required.

In the state of the art cylindrical housings have been provided with a bottom formed by a piece machined on a lathe. For vibration transmission, such a piece not only had insufficient surface smoothness (particularly at the inside), but the cylinder bottom had to be at least 1 mm thick for manufacturing reasons (bad vibration transmission, harmonics). For this reason, first polished VA discs were used as bottom parts, which were welded to the cylinder by laser beams. The disc thickness was 500 $\mu$m. A reduction of the disc thickness to 300 $\mu$m resulted in a substantial measuring signal improvement. Only the use of 25 $\mu$m thick VA foil, which was firmly attached to the cylinder provided the desired excellent signal transmission properties for the vibration sensor. With still thinner VA foils problems with the mechanical rigidity of the foil may occur (force of the inner spring).

The connection of the foil with the cylinder must be electrically conductive. It is unimportant whether the foil is cemented welded or soldered. After testing various procedures (laser beam welding, cementing, soldering), the soldering process described above has proved to be the best (for the given geometry, that is a wall thickness of 1 mm).

Because of its chemical stability, the ease of handling and the availability of polished thin foils, stainless steel was selected as the material for the sensor housing 10. In principle, other electrically conductive materials could be utilized.

Soft Metal Pressure Pad

Cylinder geometry

Diameter

For an optimal acoustic coupling the diameter of the soft metal pressure pad should correspond to that of the piezo ceramic.

Thickness

The thickness of the discs utilized was about 400 $\mu$m. However, this dimension should not be critical since the thickness was selected for manufacturing reasons (simple manufacturing of the discs from indium wire) and relatively large tolerances did not affect the signal sensitivity. Probably, In-foils of 10 $\mu$m to about 1 mm could be used, which are available from Goodfellow (Disadvantage: very expensive). The minimal thickness, however, should not be below the sum of the surface roughnesses of the piezo detector and the vibration membrane.

Material

The material used for the pressure pad have similar properties as indium (soft metal). Particularly, hardness (plasticity) compressive and tensile strength resistance should be about the same. Indium has a Brinell hardness in the range of 0.9 to 1.2, a tensile strength of 260–750 N/cm$^2$ and a compressive strength of about 220 N/cm$^2$. The photoacoustic structure is loaded by the pressure pad with a force of about 2×20N that is a pressure of about 50N/cm$^2$.

With the use of piezo detectors in which the electrical contact (ground contact) adjacent the pressure pad extends to the opposite side (2 soldering spots on one side) the material does not necessarily need to be electrically conductive. In contrast, however, the piezo type as described herein needs to have a good ground contact with sufficient conductivity.

Figure 2:
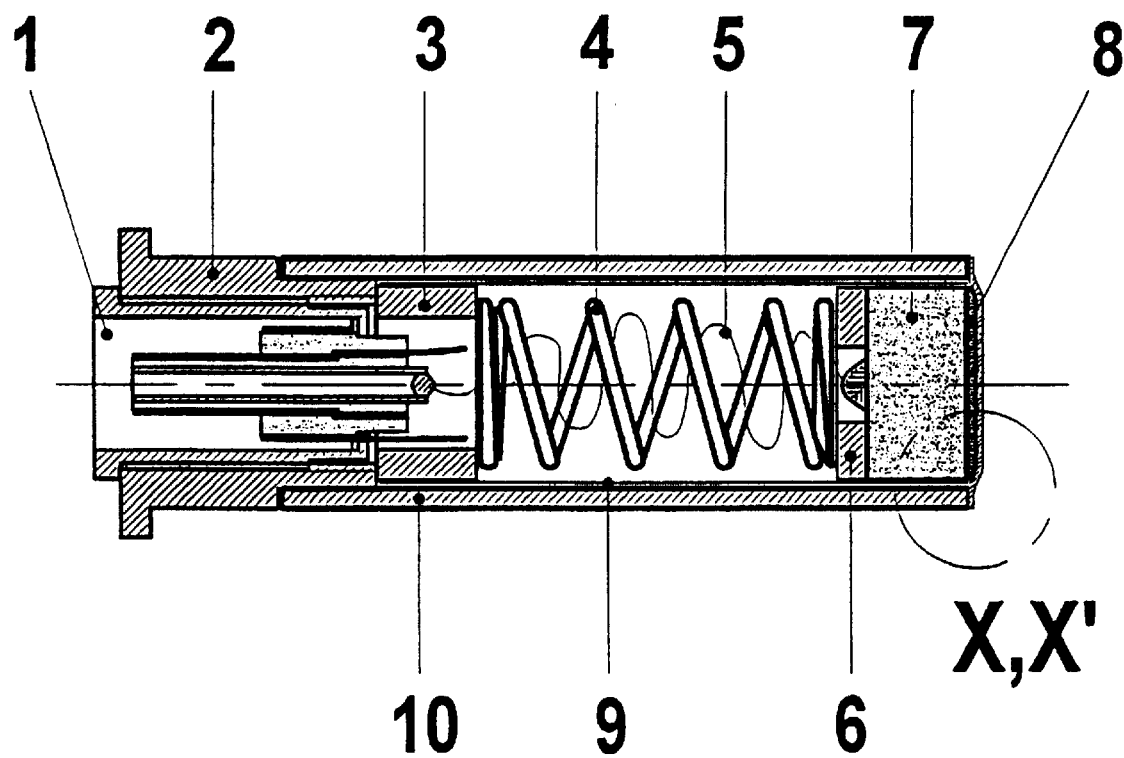
FIG. 2 shows the sensor in an assembled state.

FIG. 2 shows the pressure wave sensor in an assembled state. For a better representation of the vibration membrane 11, it is shown enlarged. On the bottom right, a section X, X' is indicated which is shown in FIGS. 3 and 4 even further enlarged.

Figure 3:
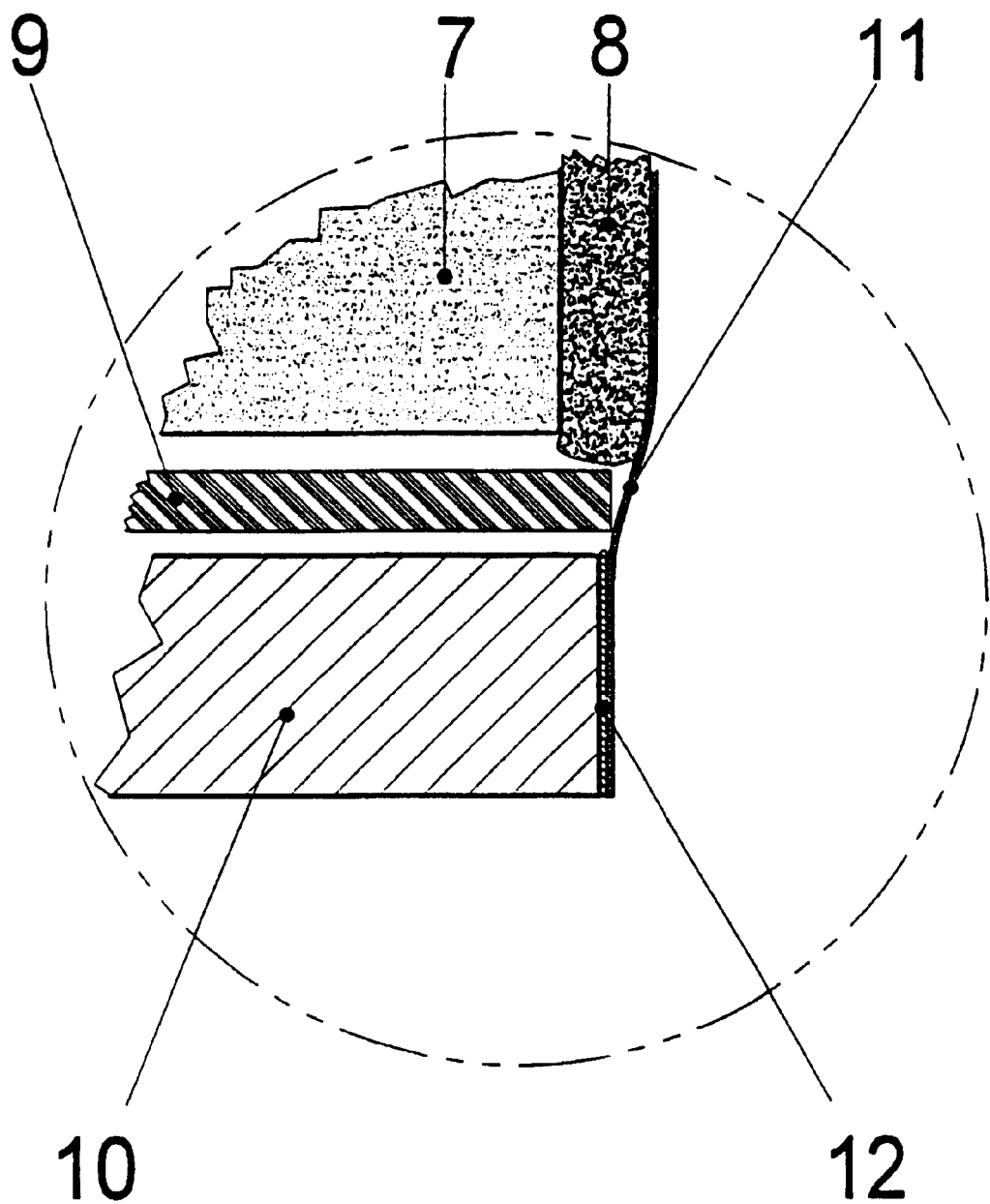
FIG. 3 is an enlarged view of the membrane area.

FIG. 3 shows the section of the pressure wave sensor (circled X) without sample cuvette. By the force of the spring 4, the vibration membrane 11 is forced outwardly via the piezo detector 7 and the pressure pad 8. Between the vibration membrane 11 and the front surface of the stainless steel housing 10, a layer 8 (disc) of a soft metal serving as connection is shown.

Figure 4:
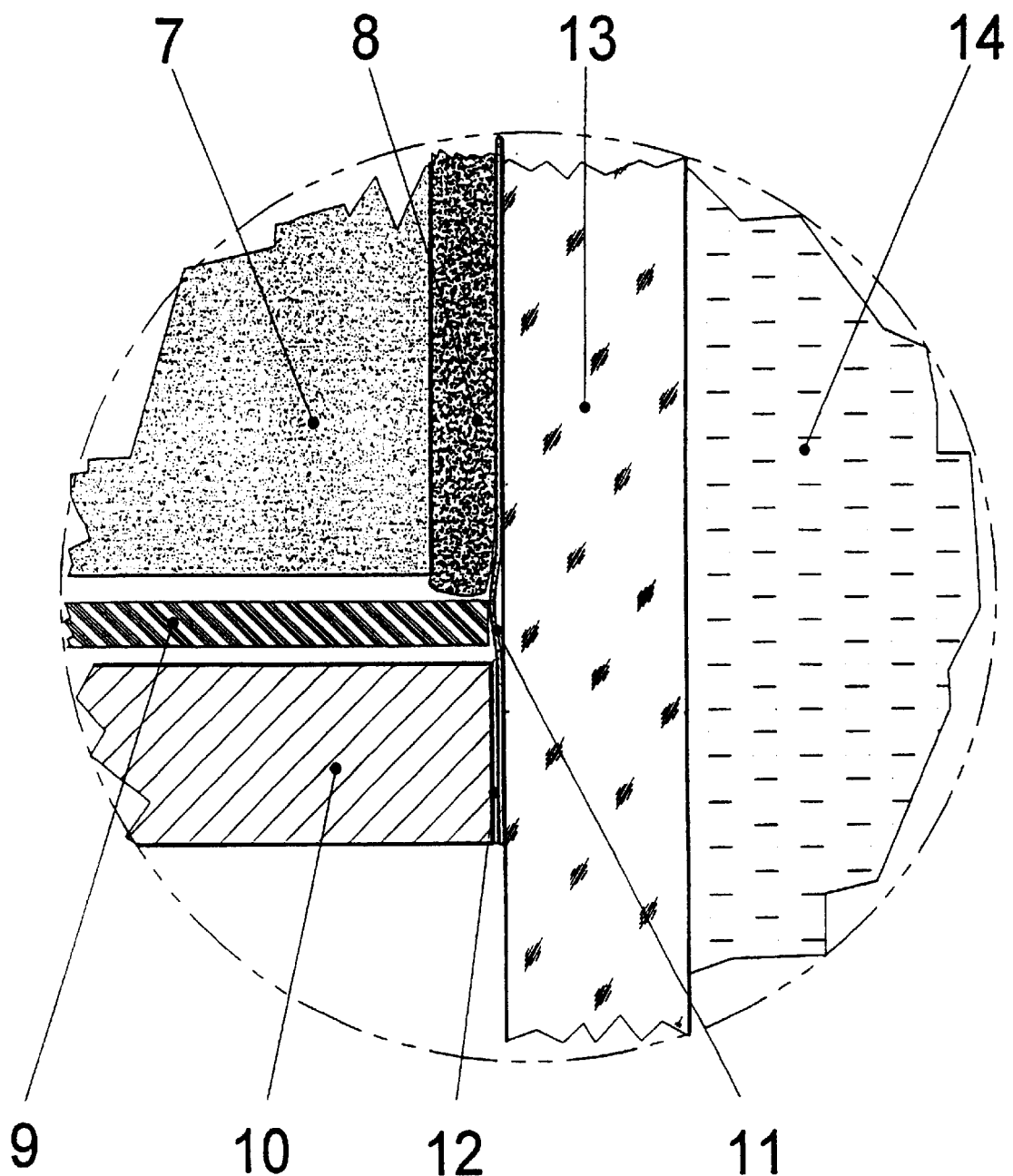
FIG. 4 shows the membrane area as it is disposed on a measuring cell.

FIG. 4 shows a section of the pressure wave sensor (circled X'), wherein the sensor is shown pressed against the window 13 of a sample cuvette. The membrane 11 is no longer bent outwardly; the housing 10 is mechanically uncoupled from the piezo detector 7. At the right of the window 13, there is the sample 14, which is to be examined.

What is claimed is:

1. A pressure wave sensor comprising a cylindrical housing having a front face, a piezo electric element disposed in said housing, a spring disposed in said housing for pressing said piezo electric element against said front face, said front face consisting of a metal foil and a pressure pad of a soft metal disposed between said piezo electric element and said metal foil, said spring being sufficiently strong to load said pressure pad beyond its yield limit.

2. A pressure wave sensor according to claim 1, wherein said metal foil has a thickness of 5 to 300 μm.

3. A pressure wave sensor according to claim 1, wherein said pressure pad has a thickness of 10–1000 μm.

4. A pressure wave sensor according to claim 1, wherein said metal foil consists of stainless steel.

5. A pressure wave sensor according to claim 1, wherein said pressure pad consists of indium.

* * * * *